United States Patent [19]
Purdy et al.

[11] 3,897,223
[45] July 29, 1975

[54] NB JOINED TO ALUMINA WITH NI-TI EUTECTIC SEAL

[75] Inventors: David L. Purdy; John F. Williams, both of Indiana, Pa.

[73] Assignee: Arco Nuclear Company, Leechburg, Pa.

[22] Filed: Oct. 17, 1974

[21] Appl. No.: 515,806

Related U.S. Application Data

[62] Division of Ser. No. 374,011, June 27, 1973, which is a division of Ser. No. 127,807, March 4, 1971, abandoned, which is a division of Ser. No. 624,916, March 21, 1967, Pat. No. 3,599,317.

[52] U.S. Cl. ........................ 29/195; 29/198; 29/504
[51] Int. Cl.² ........................................ B32B 15/04
[58] Field of Search ................ 29/198, 195 M, 504

[56] References Cited
UNITED STATES PATENTS

| | | | |
|---|---|---|---|
| 2,857,663 | 10/1958 | Beggs | 29/473.1 |
| 2,859,512 | 11/1958 | Dijksterhvis et al. | 29/473.1 |
| 3,091,028 | 5/1963 | Westbrook et al. | 29/473.1 |
| 3,395,993 | 8/1968 | Bristow | 29/473.1 X |
| 3,594,895 | 7/1971 | Hill et al. | 29/195 X |

*Primary Examiner*—C. Lovell
*Assistant Examiner*—Arthur J. Steiner
*Attorney, Agent, or Firm*—John R. Ewbank; Hymen Diamond

[57] ABSTRACT

The method of joining members 23 and 21 (FIG. 1) of copper and tungsten and members 33 and 31 (FIG. 2) of copper and corrosion and/or temperature-resistant nickel-base alloys in the practice of which a mass 25 (FIG. 1) of titanium is interposed between the members and the joint is heated to produce a eutectic of copper and titanium and then permitted to solidify.

The like method for joining members 53 and 56 (FIG. 6) of niobium and aluminium oxide in which a mass of nickel and titanium or of titanium alone are interposed between the members.

Brazed assemblies produced by the methods.

A high-temperature resistant vacuum seal of niobium and aluminium oxide.

2 Claims, 9 Drawing Figures

PATENTED JUL 29 1975 3,897,223

SHEET 1

NB JOINED TO ALUMINA WITH NI-TI EUTECTIC SEAL

BACKGROUND OF THE INVENTION

This application is a division of Ser. No. 374,011, filed June 27, 1973, which in turn is a division of abandoned Ser. No. 127,807, filed Mar. 4, 1971, which in turn is a division of Ser. No. 624,916, filed Mar. 21, 1967 and now U.S. Pat. No. 3,599,317.

This invention relates to metals joining and has particular relationship to the joining by metallurgical seals of materials encountered in the producing of electrical generators for regions where commercial power is not available; typically remote regions of the earth and outer space. In such generators the primary source of power is highly radioactive material. Such sources require massive shielding which, because of the heat developed, must also be refractory. The shielding material commonly used is either wholly or predominately composed of tungsten. A suitable shielding material is an alloy of 97.6% tungsten and 2.4% nickel and copper which is sold by Kennametal, Inc. under the name KENNERTIUM alloy and disclosed in Kennametal leaflet L-502. In converting into electricity the heat developed by the radioactive material it is necessary to join the shielding to copper. The space in which the copper and tungsten or its alloys are joined is, in the generators, highly evacuated. It is an object of this invention to provide a strong, heat-resistant, highly thermally-conducting joint usable in a high vacuum between a member of copper and a member wholly or predominately composed of tungsten.

In accordance with the teachings of the prior art, members of copper and tungsten and its alloys are joined by brazing with silver-copper brazing compounds. These brazing compounds have high vapor pressures and are unsuitable for use in an evacuated space.

It is an object of this invention to overcome the above-described disadvantages of the prior art and to provide a method of producing a metallurgical joint or seal between members predominately or wholly of tungsten and of copper which shall not have high vapor pressure and also to produce a brazed assembly of such members which shall not have high vapor pressure.

In certain electrical generators in which the heat source is a radioactive material the heat is converted into electrical energy by thermoelectric modules. It is necessary that the heat be transferred from the radioactive capsule to the hot junction of the thermoelectric elements to the modules through a highly thermally conducting member which is electrically insulating. The metallic parts, for example the pressure tight container, of the thermoelectric module is, in some generators, composed of HASTELLOY C, X or B alloys to achieve corrosion resistance, and a maximum of strength while minimizing bypass heat flow to the cold junctions of the modules.

HASTELLOY C, X and B are sold by Union Carbide Corporation and are described in Union Carbide Corporation leaflets F30,037D of October 1964 and F30,107C of June 1963 and also in the table on page 173 of the 1965 issue of Materials Design Engineering — Materials Section. These alloys have substantially the following compositions in percent:

|       | HASTELLOY C | HASTELLOY X | HASTELLOY B |
|-------|-------------|-------------|-------------|
| Ni    | 54          | 47          | 61          |
| Mo    | 16          | 9           | 28          |
| Cr    | 15.5        | 22          | 1           |
| Fe    | 5           | 18          | 5           |
| W     | 4           | 0.6         |             |
| Co    | 2.5         | 1.5         | 2.5         |
| C     | 0.08        | 0.1         | 0.05        |
| Other | 2.92        | 1.8         | 2.45        |

The highly thermally conducting member is interposed between the container and the hot junctions and the heat is transferred from the container through a copper plate on the member. In producing generators with a radioactive source it is necessary to produce a seal between the HASTELLOY nickel alloys and copper and it is an object of this invention to provide a method for producing such a seal and also to provide brazed assemblies of members of the above tabulated alloys and copper.

Some generators with a radioactive source require that an electrical connection be established through a vacuum seal all or part of which is located in regions of the generators which are at a high temperature. The prior-art seals between iron-nickel-cobalt (KOVAR alloy) and boro-silicate glass and related seals do not lend themselves to use in this service because the temperature of the regions in which the seals are located are substantially higher than the temperature that such prior-art seals can withstand. It is an object of this invention to overcome these disadvantages of the prior-art and to provide a high-temperature-resistant vacuum seal and a method of producing such a seal.

SUMMARY OF THE INVENTION

This invention in one of its aspects arises from the discovery that the eutectic of titanium and copper wets, and adheres to a surface of tungsten or predominately tungsten. In accordance with this invention a seal is provided between a member of copper and a member wholly or predominately of tungsten by interposing a thin mass of titanium between the members to form a joint of the members and the mass and by heating this joint in a vacuum to a temperature at which the joint liquefies and thereafter cooling the joint to room temperature to solidify the joint. The mass is preferably a thin shim of titanium but may be a wire or even a powder of titanium. Copper titanium eutectic has a temperature of about 870°C. Typically, the joint is heated to 900°C and the liquid produced maintained above this temperature (950°C) for about 1 minute and then cooled slowly (typically in about 2 hours) to room temperature. A high-temperature resistant, highly thermally conducting, low vapor-pressure joint or seal is produced in this way.

Another aspect of this invention arises from the discovery that the copper-titanium eutectic also wets, and adheres to the above tabulated HASTELLOY C, X and B nickel alloys. In accordance with this aspect of this invention a thin titanium mass is interposed between members of the nickel alloys and copper to form a joint and the joint is heated in a vacuum to a temperature at which it liquefies and thereafter is permitted to solidify to form a seal. This seal is included in the highly thermally conducting electrically insulating member.

A further aspect of this invention arises from the discovery that niobium and the insulator aluminum oxide ($Al_2O_3$) sold under the name LUCALOX have thermal coefficients of expansion which closely match over a wide range of temperatures extending, at the high-temperature-end of the range, well into the temperatures demanded by the generators with radioactive source. It has also been discovered that nickel-titanium and nickel-niobium eutectics not only wet, and adhere to, aluminum oxide but also wet and adhere to niobium. In accordance with this invention a vacuum seal is provided for an electrically insulated electrical conductor which includes an insulator of aluminum oxide sealed to niobium and which is capable of remaining vacuum tight at the high temperature at which the generators having a radioactive heat source operate. This seal includes a member of niobium and a member of aluminum oxide sealed by a eutectic of nickel and titanium. In producing this seal a thin mass of nickel and titanium is interposed between the members, or positioned so that the eutectic flows by capillarity between the members, and the joint thus formed is heated in a vacuum or other non-reactive atmosphere to a temperature at which it becomes liquid and then solidifed. The mass may be in the form of shims of nickel and titanium interposed between the members or a wire or powders. Instead of interposing the thin mass between the members, the mass may be placed on the ends of the members over the joint between them so that the liquid formed flows into the joint by capillarity. Wires of nickel and titanium may be entwined or braided. The relationship of the shims, wires or powders should be such that the weight of the nickel is appropriately related to the weight of titanium. The nickel-titanium eutectic requires 66.2% nickel and the remainder titanium. The nickel-titanium eutectic is formed at about 1,118°C and for this eutectic the joint should be heated to about 1,125°C. The vacuum-tight assembly thus produced can withstand high temperatures and has low vapor pressure. In addition, it is resistant to corrosive vapors and liquids; for example, to alkali metals such as cesium.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DESCRIPTION OF PREFERRED EMBODIMENT

Figure 1:
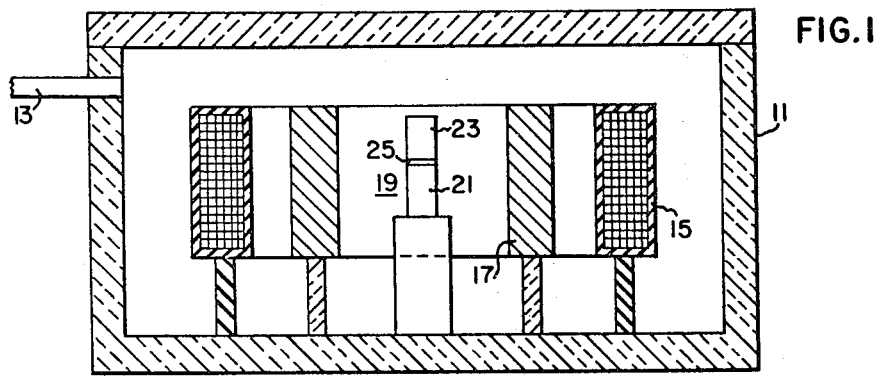
FIG. 1 is a diagrammatic view presented as a view in longitudinal section showing apparatus for practicing this invention.

The apparatus shown in FIG. 1 includes a closed container 11 having one or plurality of connections 13 for evacuation by a pumping system (not shown). Within the container there is a heating coil 15 which may be supplied from a source of high-frequency power (not shown). Within the coil there is a susceptor 17 of tantalum or other suitable material. The work 19 to be joined is mounted within the susceptor.

Typically the work 19 may include a cylinder 21 of KENNERTIUM tungsten alloy and a cylinder 23 of copper. A thin mass 25 of titanium is interposed between the cylinders 21 and 23. The purpose of the susceptor is to provide even heating of the work piece 19 and to eliminate high temperature spots on the work by reason of directly induced currents from the field of coil 15 into the work.

In the practice of this invention the chamber 11 is evacuated to low pressure, for example of the order of $10^{-6}$ Torr. The coil 15 is then energized heating the susceptor 17 to a high temperature. The radiation from the susceptor 17 heats the joint including the titanium mass to a temperature at which it produces a copper-titanium eutectic and becomes liquid. The joint is then permitted to solidify. The resulting structure is a brazed assembly of copper and tungsten alloy which is strong, high temperature-resistant, highly heat conducting and has low vapor pressure.

EXAMPLE I

A slug 21 of KENNERTIUM alloy approximately 0.75 inches in diameter and 2 inches in length was placed within the susceptor 17 in the container 11. On top of this slug 21 was placed a 0.0002 inch shim 25 of pure titanium of approximately the same diameter as the tungsten alloy. Then a copper slug 23 0.5 inches in length and of the same diameter as the tungsten was placed on the top of both.

The container 11 was pumped down to a pressure 5 × $10^{-6}$ Torr. A chromel-alumel thermocouple (not shown) was attached to the tungsten slug 21 to measure temperature.

Figure 4:
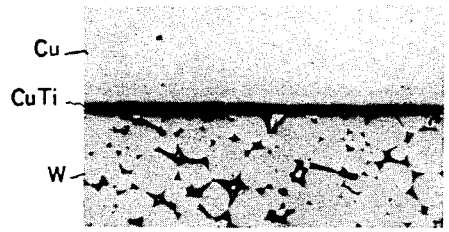
FIGS. 4, 5, 6 and 7 are photomicrographs of two tungsten-alloy-copper joints, a nickel-alloy-copper joint, and a niobium-aluminum-oxide joint.

It was observed that at approximately 900°C the titanium shim 25 melted and formed a fillet around the slug 21. The assembly was then maintained at about 950°C for approximately 1 minute and then allowed to cool to room temperature in about 2 hours. A satisfactory brazed assembly was thus formed. A photomicrograph, at 100 magnification, of this joint is shown in FIG. 4.

EXAMPLE II

Figure 5:

The same procedure was followed using a 0.002 inch thick shim 25 of titanium and the results were also satisfactory. A photomicrograph, at 100 magnification, of this joint is shown in FIG. 5.

Figure 2:
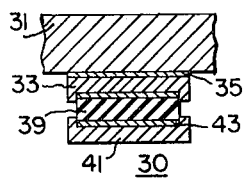
FIG. 2 is a fragmental view in section showing an electrically insulating assembly for effectively transferring heat from a member of the above-described nickel alloys.
Figure 6:
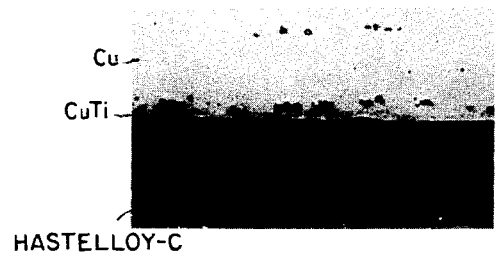

FIG. 2 shows a highly thermally conducting electrically insulating member 30 sealed to a container 31 of one of the HASTELLOY nickel alloys. The member 30 includes a copper plate 33 which is sealed to the container 31. To provide the seal 35 a thin mass of titanium is interposed between the container 31 and the plate 33 and the resulting joint is heated (to about 950°C) in a vacuum or other non-reactive atmosphere to liquefy the metal and form the joint 35. Thereafter the liquid metal is cooled slowly and solidified. FIG. 6 shows a photomicrograph, at 100 magnification, of a seal produced in this manner between HASTELLOY-C nickel-alloy and copper.

A plate 39 of aluminum oxide is sealed to the copper plate 33 typically by copper-titanium eutectic produced by interposing a shim of titanium between the plate 39 and the tube 33 and liquefying (in a non-reactive atmosphere) and then solidfying. A conductor 41 of copper to conduct heat to the hot junction of a thermoelectric element (not shown) is sealed to the aluminum oxide plate 39 by another copper-titanium seal 43.

Figure 3:
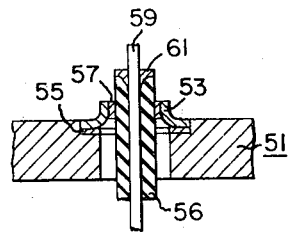
FIG. 3 is a fragmental view in section showing a high-temperature-resistant vacuum seal including a niobium and aluminum oxide joint.
Figure 7:

The seal shown in FIG. 3 includes a container 51 which may be composed of titanium. The container 51 has an opening through which a grommet 53 of niobium is sealed. The grommet 53 is of thin sheet (for example 0.010 inches thickness). The seal 55 may be effected by a nickel-titanium eutectic. For this purpose, shims of nickel are interposed between the grommet 53 and the joint thus formed is heated in a non-reactive atmosphere (to a temperature of about 1,125°C) to liquefy the metal. The joint is then permitted to solidify. A tube 56 of alumina oxide is sealed through the grommet 53. This seal 57 is produced by interposing shims of nickel and titanium between the members 56 and 53 and heating until the joint is liquefied and then cooling to solidify the joint. FIG. 7 is a photomicrograph, at 100 magnification, of a seal between niobium and aluminum oxide produced with the nickel-titanium eutectic. A tantalum feed-through wire 59 is sealed through the aluminum oxide tube 56. For this purpose shims of nickel and titanium are disposed on the tube 56 and the joint is heated (in a non-reactive atmosphere) (to a temperature of about 1,125°C) to liquefy the shims. The liquid flows by capillarity between the wire 59 and the tube 56 to produce the seal 61.

Figure 3A:
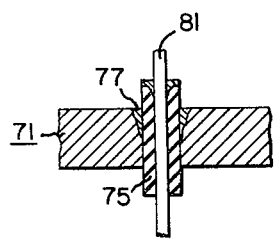
FIGS. 3A and 3B are fragmental views in section similar to FIG. 3 showing modifications of the invention shown in FIG. 3.

FIG. 3A includes a container 71 of titanium. A tube 75 of aluminum oxide is sealed through the titanium. The seal 77 is a nickel-titanium eutectic produced by heating a shim of nickel around the tube 75 (in a non-reactive atmosphere) to liquefy the shim. The liquid flows by capillarity between the container and the tube and when solidified forms the seal 77. A feed-through conductor 81 of tantalum is sealed through the tube 75 as in FIG. 3.

Figure 3B:
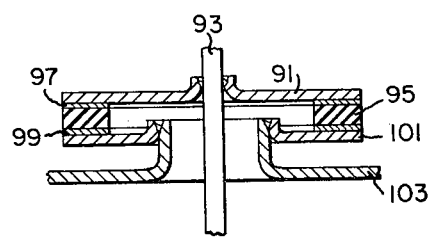

FIG. 3B shows an annular plate 91 of niobium through which a rod 93 of niobium is sealed by electron-beam welding. A ring 95 of aluminum oxide is sealed to the periphery of the plate 91. This seal 97 is produced by interposing shims of nickel and titanium between the ring 95 and plate 91 and heating (in a non-reactive atmosphere) (to about 1,125°C) to liquefy the shims and then permitting the resulting eutectic to solidify. A like seal 99 is produced at the opposite surface of the ring 95 to a second annulus 101 of niobium. The annulus 101 may be sealed into a container 103 of niobium by welding at the inner periphery of the annulus 101.

Typically the niobium annulus 91 and the annulus 101 have a thickness of about 0.010 inches and an outside diameter of about 1½ inches. The inside diameters of annuli 91 and 101 are dimension to seal to the rod 93 and container 103. The ring 95 has a thickness of about 0.1 inches, an outside diameter of 1½ inches and a width of about 0.1 inches. The soundness of the seal is improved by the flexibility of the thin niobium sheet.

While preferred embodiments of this invention have been disclosed herein, many modifications thereof are feasible. This invention, then, is not to be restricted except insofar as is necessitated by the spirit of the prior art.

We claim as our invention:

1. A vacuum-tight assembly consisting essentially of a member of aluminum oxide and a member of niobium, a mass consisting essentially of nickel and titanium in eutectic proportions melting at about 1,125°C. contiguous to and bonded to said members, the aluminum oxide member and niobium member having thermal coefficients of expansion which closely match over a wide range of temperatures, whereby a vacuum-tight assembly is maintained at the high temperature at which generators having a radioactive heat source operate.

2. A brazed vacuum-tight assembly consisting essentially of an aluminum oxide member and a member of niobium sealed together by a thin mass consisting essentially of nickel and titanium, the proportions of nickel and titanium corresponding generally to the 66.2% nickel eutectic, the aluminum oxide member and niobium member having thermal coefficients of expansion which closely match over a wide range of temperatures, whereby a vacuum-tight assembly is maintained at the high temperature at which generators having a radioactive heat source operate.

* * * * *